US005102177A

United States Patent [19]

Dreisig et al.

[11] Patent Number: 5,102,177

[45] Date of Patent: Apr. 7, 1992

[54] ARTICLE GRIPPER HAVING OPPOSED JAWS CAMMED OPEN BY AN ARTICLE

[75] Inventors: Robert C. Dreisig, West Chester, Ohio; Raymond L. Hallbach, Simpsonville, S.C.; David I. McDonald, Cincinnati, Ohio

[73] Assignee: Cincinnati Milacron Inc., Cincinnati, Ohio

[21] Appl. No.: 758,255

[22] Filed: Aug. 26, 1991

Related U.S. Application Data

[63] Continuation of Ser. No. 535,632, Jun. 11, 1990, abandoned.

[51] Int. Cl.[5] .......... B23Q 3/00; B25J 15/08

[52] U.S. Cl. .......... 294/106; 29/568; 294/902; 901/39

[58] Field of Search .......... 294/99.1, 104, 106, 294/110.1, 116, 902; 29/568; 81/3.8; 269/26, 254 CS; 414/753; 901/39, 41

[56] References Cited

U.S. PATENT DOCUMENTS

| | | | |
|---|---|---|---|
| 981,857 | 1/1911 | Hubbard et al. | 81/3.08 |
| 2,040,669 | 5/1936 | Odmark | 269/254 CS |
| 2,418,773 | 4/1947 | Kahanek | 81/3.08 |
| 2,954,063 | 9/1960 | Wilbur | 294/106 X |
| 3,048,281 | 8/1962 | Godfrey | 294/106 X |
| 3,147,993 | 9/1964 | Broderson et al. | 294/106 |
| 3,845,546 | 11/1974 | Rutschke | 294/116 X |
| 3,868,102 | 2/1975 | Pevar | 269/26 |
| 3,990,140 | 11/1976 | Polacek et al. | 294/106 X |
| 4,068,882 | 1/1978 | van der Schoot | 294/106 X |
| 4,126,233 | 11/1978 | Jeske | 294/104 X |
| 4,343,077 | 8/1982 | Satoh et al. | 414/753 X |
| 4,505,020 | 3/1985 | Kinoshita | 29/568 |
| 4,858,980 | 8/1989 | Dreisig et al. | 294/99.01 |
| 4,874,156 | 10/1989 | Goldzweig | 269/254 CS X |
| 4,890,716 | 1/1990 | Kitamura | 198/346.1 |

*Primary Examiner*—Johnny D. Cherry
*Attorney, Agent, or Firm*—Thomas M. Farrell

[57] ABSTRACT

An article gripper has two cantilevered jaws biased together by a spring assembly to hold an article between arcuate surfaces of the jaws. The jaws are cantilever-mounted from respective pivot pins, and the article enters radially through an opening formed between the outboard ends of the cantilevered jaws. Between the pivot pins and the gripped article, the jaws have inter-engaging teeth which permit ease of engagement and disengagement as the jaws are pivoted, yet the teeth prevent unwanted sliding movement of one jaw past the other, as an article is located within the jaws.

10 Claims, 3 Drawing Sheets

ARTICLE GRIPPER HAVING OPPOSED JAWS CAMMED OPEN BY AN ARTICLE

This is a continuation of copending application Ser. No. 07/535,632 filed on June 11, 1990 now abandoned.

BACKGROUND OF THE INVENTION

The invention relates broadly to the field of article grippers and, in particular, the invention relates to tool grippers for tool storage magazines and to article gripper mechanisms such as part loaders which may be used with machine tools.

A variety of article grippers have been used in conjunction with tool handling and part handling machinery, where the tool grippers are often configured as having a pair of independent fingers or jaws which may be opened and closed in a pincer-like movement to grasp the desired article. Some gripper fingers are relatively moved with respect to one another by fluid-powered actuators such as air cylinders. Still other mechanisms make use of a spring device to bias the jaws toward one another to thereby grip the desired article.

Certain prior art devices have been constructed from injection molded plastic, where the plastic has an inherent spring rate and may be deflected through a range of movement to permit part entry and exit. One such prior art device is described in U.S. Pat. No. 4,858,980, of Dreisig et al, assigned to Cincinnati Milacron Inc., the assignee of the present invention. In this reference, a movable jaw is supported on flexible reed springs which are integral with a gripper base which supports a fixed jaw.

Still another prior art device, German Reference DE3511470A1, provides for a one-piece plastic gripper, having jaw portions which may be spread from their normal position to permit entry and exit of a workpiece.

One difference between the '980 patent and the German reference is the '980 patent provides for different loads to be seen by the workpiece during entry and exit, whereas in the German reference the spring force is substantially at 90° to the entry and exit path of the workpiece and, thus, the load to deflect the two beam-like jaw portions is the same whether a workpiece is entering or exiting the gripper. Both references have fixed spring loads.

The inventors of the present invention have studied the inherent problems and advantages of the prior art devices and have determined that modern requirements for machine tools, in particular. dictate that low cost be an objective in the overall design of the device.

The inventors have determined that a force-supplying means such as a spring and bolt combination acting at 90° to the part entry and exit path will yield an easily-adjustable means for varying the clamp force of the gripper, and thus need not rely on the inherent springyness of the material from which the jaws are made. This freedom permits greater latitude in jaw design. It will be noted that, for parts made from engineering grade plastics, initial preloads and clamping loads held for long periods of time may tend to dissipate as the material relaxes and the phenomenon of creep takes over.

Accordingly, it is preferred that an article gripper include a stable spring device which is adjustable and which will hold its set load for substantial periods of time; and, for a plastic gripper, without the plastic constraint exhibiting creep.

SUMMARY OF THE INVENTION

It is an object of the present invention to produce an article gripper having deflectable jaws and an adjustable preload spring, where the jaws will tend to separate uniformly about a radially-moving workpiece.

The invention is shown embodied in an article gripper for an article storage unit comprising: a first jaw cantilevered from a first pivot joint on an article carrier; a second jaw cantilevered from a second pivot joint on said article carrier; an opening between the outboard ends of the cantilevered first and second jaws; first and second article holding surfaces in the respective jaws, facing each other, for cradling an article therebetween; spring means for biasing the jaws together; and means for preventing either jaw from sliding past the other. wherein an article may be reversibly radially moved through the opening, overcoming the spring means, to spread the jaws when inserting or removing articles.

DESCRIPTION OF THE PREFERRED EMBODIMENT

Figure 1:
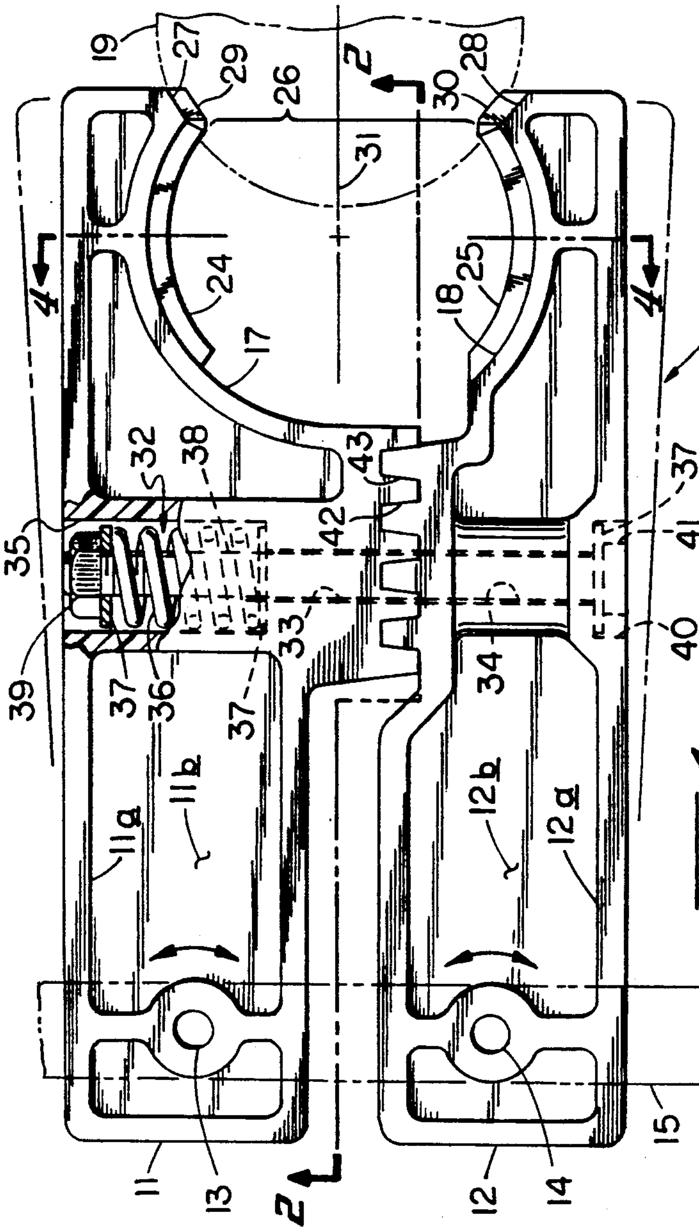
FIG. 1 is a front elevational view of a tool gripper assembly.

Referring to FIG. 1, an article holding assembly or tool gripper 10 is depicted which may be used on a variety of machines, for example, the HPMC machining center manufactured by Cincinnati Milacron Inc., the assignee of the present invention. Such machine is depicted in U.S. Pat. No. 4,858,980, the specific details of which are incorporated herein by reference, where rotary tools are relatively moved in a radial direction when entering or exiting tool gripper storage. Machining Centers frequently employ toolchanging mechanisms, wherein a plurality of tool grippers are necessarily mounted in a tool storage matrix, and one type of tool storage matrix includes a chain conveyor for supporting the tool grippers.

Figure 2:
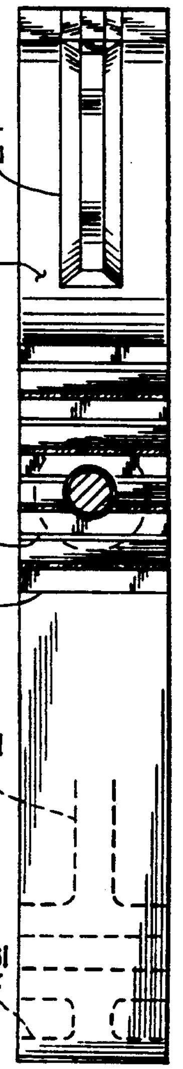
FIG. 2 is bottom plan view of the first jaw of the tool gripper assembly of FIG. 1, taken along the line 2—2 of FIG. 1.
Figure 3:
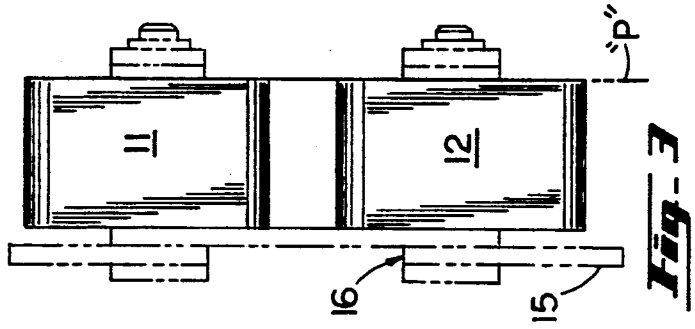
FIG. 3 is an end elevational view of the tool gripper assembly of FIG. 1.

With that background in mind, the tool gripper 10 of FIG. 1 comprises cantilevered first and second jaws 11,12 which are pivotally carried on respective pivot pins 13,14 which may, in the example shown, coincide with the spaced pin joints for links 15 of a chain conveyor assembly 16. As shown in FIGS. 2 and 3, the gripper jaws 11,12 are of unitary width lying in the same plane, "P", and, accordingly, may be manufactured from flat plate or bar stock, of a variety of materials. In the preferred embodiment, however, it is desirable that the jaws 11,12 be formed by the injection molding process from a suitable grade of engineering plastic, for example, "DELRIN" acetal resin, preferably reinforced with fibers such as glass or carbon fibers. In their molded forms, the first and second jaws 11,12 are configured as having a rim 11*a*,12*a* of plastic of uniform width, supported by a central web 11*b*,12*b*, i.e., the jaws 11,12 are produced with uniform coring on both sides.

The respective jaws 11,12 are formed with arcuate gripper surfaces 17,18 which provide a certain amount of wrap-around to a tool holder 19 which is gripped therebetween.

Figure 4:
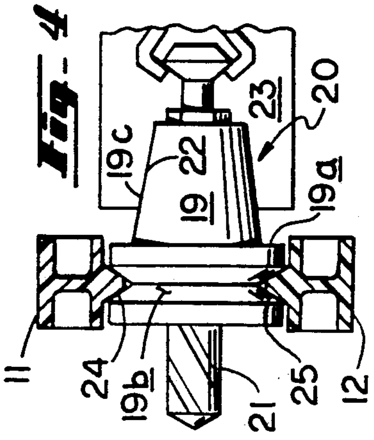
FIG. 4 is a side elevational section through a tool gripper assembly supporting a tool.

With brief reference to FIG. 4, a representative tool 20 is depicted, where the actual cutter 21 may be varietal (end mills, drills, etc.), and the cutter 21 is affixed to a common tool holder 19. The tool holder 19 depicted is of a well-known "V-flange" design, wherein a circular flange 19*a* is provided with an annular V-groove 19*b* which may be used for gripping when changing tools, or for retention when storing tools. The tool holder 19 also has a tapered shank 19*c* which is received in a cooperating tapered socket 22 of a tool spindle 23.

For the toolholder 19 of FIG. 4, the arcuate surfaces 17,18 of the respective jaws 11,12 are each provided with a short arc segment 24,25 having a keystone cross-sectional shape, to fit the V-groove.

To permit tools 20 to enter and exit the tool gripper 10, the beam-like jaws 11,12 cantilevered from the pivot pins 13,14 are provided with an opening 26 formed therebetween at their outboard ends, and an entry chamfer 27,28 is formed on each jaw 11,12. A keystone-shaped guide 29,30 is formed on the chamfer 27,28 and flattened where it intersects the arc segment 24,25. As the tool 20 is radially moved along an axis 31 defined between the jaws 11,12, the jaws 11,12 will be cammed open when contacted by the tool flange 19*a*. To hold the jaws 11,12 together, a biasing spring means 32 is provided between the gripped tool and jaw pivot pins 13,14, exerting a force normal to the axis 31 of tool movement.

The jaws 11,12 have in-line clearance holes 33,34. The first jaw 11 has a deep counterbore 35 within which is seated a compression spring 36, sandwiched between thrust washers 37, all held together by a long bolt 38 passing through the entire assembly from the second jaw 12. A nut 39 is received on the bolt 38 to provide for adjustment of the biasing spring force. The second jaw 12 has a shallow counterbore 40 containing a thrust washer 37 to adequately distribute the load of the bolt head 41.

In order to accommodate manufacturing and alignment tolerances which might cause an entering tool to bear against one jaw before the other, and result in unwanted sliding of one jaw past the other, the jaws 11,12 are provided with mating interengaging straight rack teeth 42,43 running across their widths, having an included angle of 20°. The trapezoidal rack tooth form permits the jaws 11,12 to disengage when pivoted, yet provides resistance to relative sliding past one another as a tool 20 enters the gripper 10.

FIG. 2 shows the teeth 42 for the first jaw 11, and it will be appreciated that the second jaw 12 would have mating teeth 43.

Figure 9:
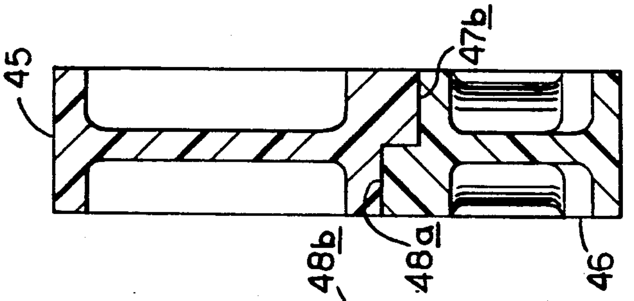
FIG. 9 is a side elevational section taken along the line 9—9 of FIG. 5.
Figure 8:
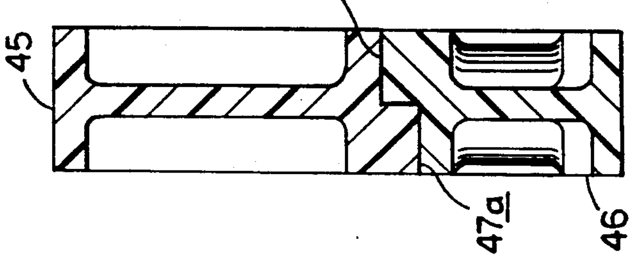
FIG. 8 is a side elevational section taken along the line 8—8 of FIG. 5.
Figure 7:
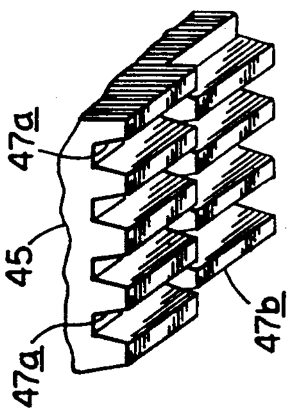
FIG. 7 is a perspective view showing the two rows of staggered teeth of the first jaw of FIGS. 5 and 6.
Figure 5:
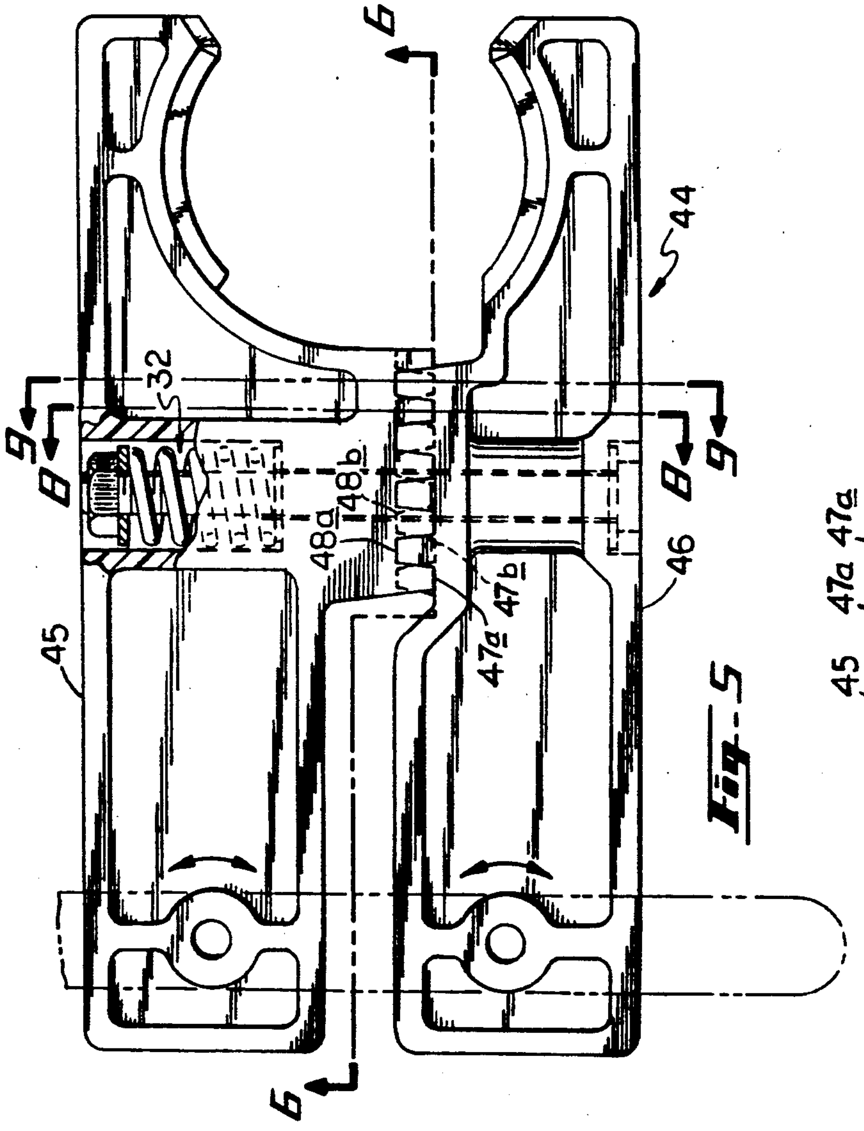
FIG. 5 is a front elevational view of an alternate embodiment tool gripper assembly having rows of staggered teeth on each jaw.
Figure 6:
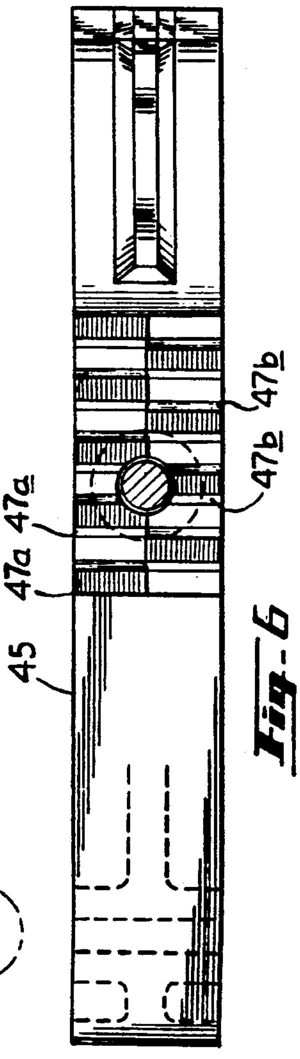
FIG. 6 is a bottom plan view of the first jaw of the tool gripper assembly of FIG. 5, taken along the line 6—6 of FIG. 5.

In an alternate embodiment depicted in the gripper 44 of FIG. 5, the jaws 45,46 are each provided with two rows of staggered teeth 47*a,b*,48*a,b*, as illustrated in FIGS. 6 and 7. The purpose of the staggered teeth on the first and second jaws 45,46 is to further stiffen the assembly so that the jaws 45,46 will neither slide sideways while enmeshed, nor deflect out-of-plane with respect to one another. Out-of-plane deflection may arise when certain gripped heavy tools tend to tip endover and subject the jaws 45,46 to an overturning moment. As seen in the sections of FIGS. 8 and 9, the interlocked jaws 45,46 cannot be shifted side-to-side from one another.

Figure 11:
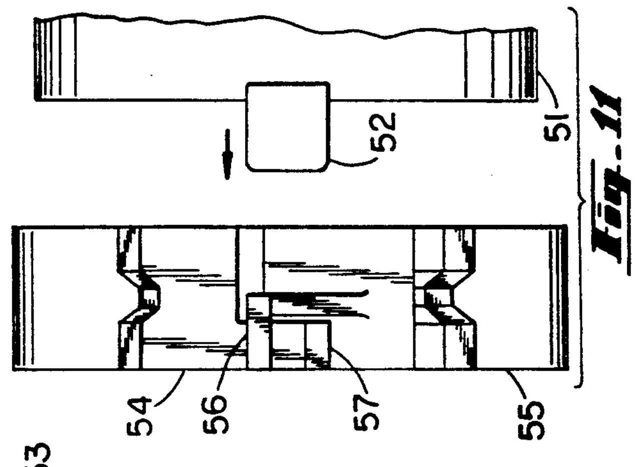
FIG. 11 is an end view of the tool gripper assembly of FIG. 10.
Figure 10:
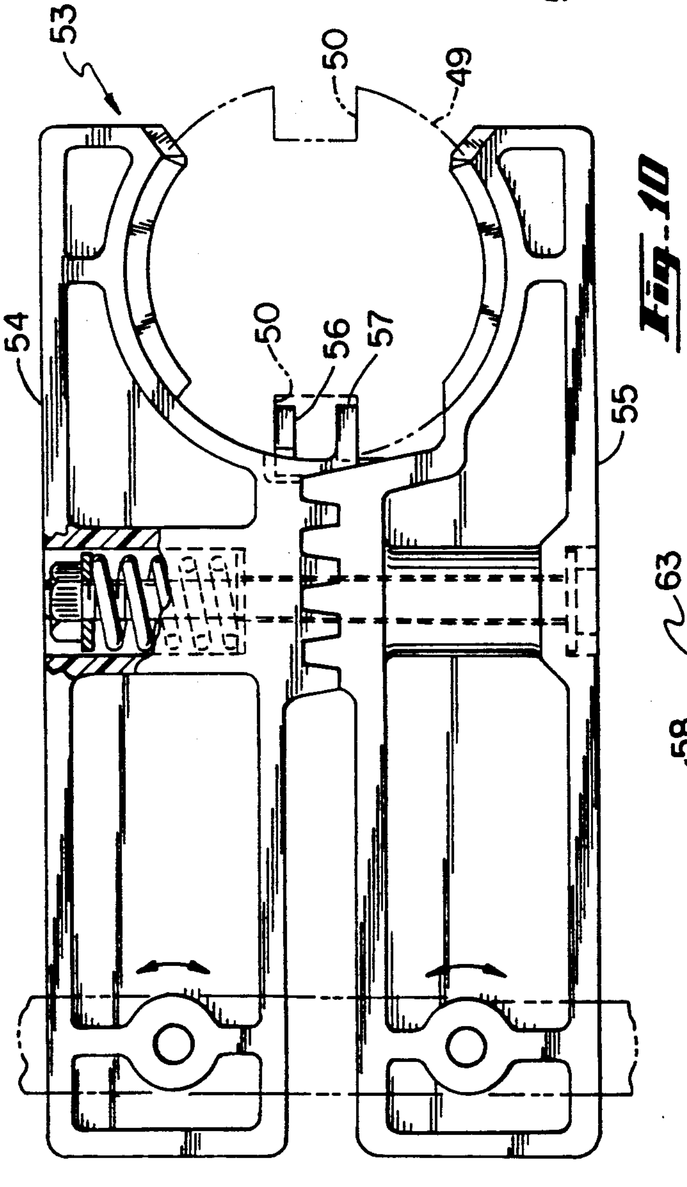
FIG. 10 is a front elevational view of an alternate embodiment tool gripper assembly having means for maintaining tool orientation.
Figure 12:
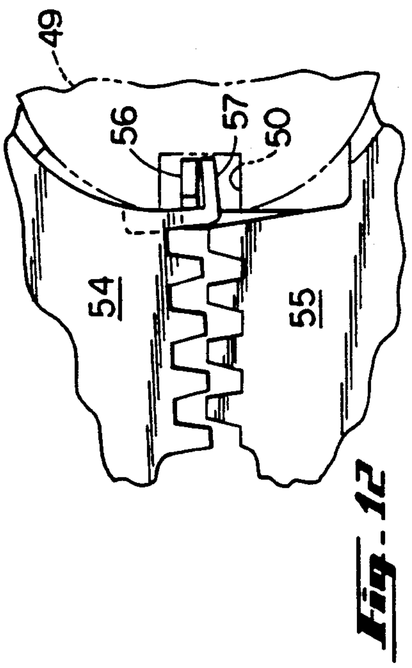
FIG. 12 is a partial front elevational view of the gripper assembly of FIG. 10, with the jaws in an open position.

In another alternate embodiment depicted in FIGS. 10, 11, and 12, a tool 49 has a pair of keyways 50 disposed 180° apart on its outer diameter. A machine spindle 51 (FIG. 11) has a pair of drive keys 52 for providing torque to the tool 49, in a well-known manner. The machine spindle 51 has an angular orientation means (not shown), so it is necessary to maintain angular orientation of the tool 49 for interference-free tool exchanges. FIG. 10 shows a tool gripper 53 having first and second jaws 54,55, which may, for convenience be referred-to as "upper" and "lower" jaws, in turn, supporting upper and lower parallel tangs 56,57. The tangs 56,57 simulate an orienting key, the upper tang 56 formed as an integral part of the lower jaw 55, and the lower tang 57 formed as an integral part of the upper jaw 54. Thus, when the jaws 54,55 are spread by the radially movable tool 49, as in FIG. 12, the tangs 56,57 will move toward one another. The reverse movement will allow the tangs 56,57 to find the tool keyway 50 easily to ensure proper tool orientation. As shown in FIG. 11, the tangs 56,57 extend through approximately half the width of the gripper 53, to permit tool engagement by the drive keys 52 as the machine spindle 51 is advanced in the direction of the arrow in FIG. 11.

Figure 13:
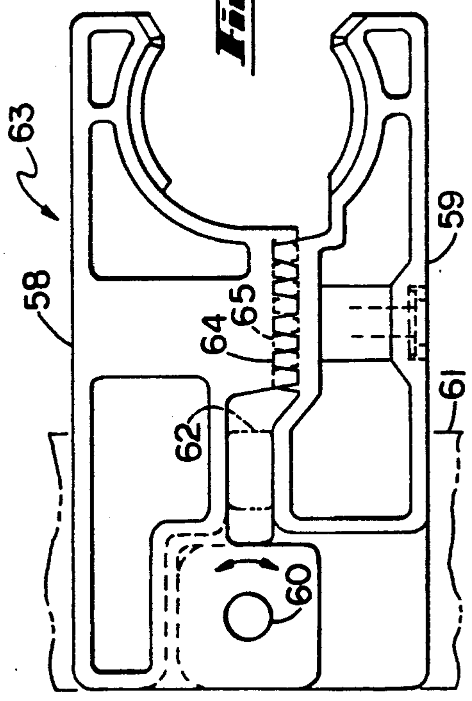
FIG. 13 is a top plan view of a tool gripper assembly having a common jaw pivot point.

A further alternate embodiment, illustrated in the plan view of FIG. 13, shows the staggered tooth arrangement of FIGS. 5–9, where the jaws 58,59 may swing from a common pivot pin 60 on a gripper carrier 61. In this configuration, where the carrier 61 may include a block 62 to function as a means for aligning the tool gripper 63, the interlocked teeth 64,65 cause the jaws 58,59 to resist relative twist and out-of-plane deflection; the reference is to a horizontal plane for this example, but the embodiment is not so limited.

While the invention has been shown in connection with preferred and alternate embodiments, it may be appreciated by those skilled in the art that other designs may be accomplished within the spirit and scope of the invention. For example, the rack teeth may be replaced with other lugs suitable for the purpose intended. Therefore, it is not intended that the invention be limited to the embodiments described, but rather, the invention extends to all such designs and modifications as come within the scope of the appended claims.

What is claimed is:

1. In a toolchanging machining center utilizing a carrier for tools held in a tool storage unit wherein the carrier employs plural tool grippers and each tool gripper is cammed open by a tool, an improved tool gripper comprising:

first and second jaws, each jaw having a first end pivotally joined to pivot means on said carrier, and each jaw having a second end extending away from said carrier, said second ends being spaced apart from one another to thereby define an opening;

first and second toolholder surfaces in respective jaws proximal the second end, said first and second toolholder surfaces facing each other, for cradling a tool therebetween;

means for biasing said jaws together; and tooth means for permitting independent pivotal motion of each of said first and second jaws, and for substantially resisting translatory motion of said jaws with respect to one another as a tool is relatively moved against said jaws through said opening when relatively entering or exiting said first and second toolholder surfaces.

2. The tool gripper of claim 1, further including keying means for maintaining the orientation of a gripped tool with respect to said first and second jaws.

3. In a machine utilizing a carrier for articles held in an article storage unit wherein the carrier employs plural article grippers and each article gripper is cammed open by an article, an improved article gripper comprising:

a first jaw having a first end pivotally connected to a first pivot joint on said carrier, and having a second end extending away from said carrier;

a second jaw having a first end pivotally connected to a second pivot joint on said carrier, and having a second end extending away from said carrier, said first and second jaws lying in a common plane with their respective second ends spaced apart from one another to thereby define an opening;

first and second article holding surfaces in respective jaws proximal the second end, said first and second article holding surfaces facing each other, for cradling an article therebetween;

means for biasing said jaws together; and tooth means for permitting independent pivotal motion of each of said first and second jaws, and for substantially resisting translatory motion of said jaws with respect to one another as an article is relatively moved against said jaws through said opening when relatively entering or exiting said first and second article holding surfaces.

4. The article gripper of claim 3, further comprising means for preventing said jaws from moving with respect to each other, side-to-side, in a direction normal to said plane.

5. The article gripper of claim 4, further including means for maintaining the orientation of a gripped article with respect to said first and second jaws.

6. The article gripper of claim 3, further including means for maintaining the orientation of a gripped article with respect to said first and second jaws.

7. In a toolchanging machining center utilizing a carrier for tools held in a tool storage unit wherein the carrier employs plural tool grippers and each tool gripper is cammed open by a tool, an improved tool gripper comprising:

a first jaw having a first end pivotally connected to a first pivot joint on said carrier, and having a second end extending away from said carrier;

a second jaw having a first end pivotally connected to a second pivot joint on said carrier, and having a second end extending away from said carrier, said first and second jaws lying in a common plane with their respective second ends spaced apart form one another to thereby define an opening;

first and second toolholder surfaces in respective jaws proximal the second end, said first and second toolholder surfaces facing each other, for cradling a tool therebetween;

spring means for biasing said jaws together; and tooth means for permitting independent pivotal motion of each of said first and second jaws, and for substantially resisting relative sliding motion of said jaws, in the direction of relative tool movement, as a tool is relatively moved against said jaws through said opening when relatively entering or exiting said first and second toolholding surfaces.

8. The tool gripper of claim 7, further comprising means for preventing said jaws from moving with respect to each other, side-to-side, in a direction normal to said plane.

9. The tool gripper of claim 8, further including key means for maintaining the orientation of a gripped tool with respect to said jaws.

10. The tool gripper of claim 7, further including keying means for maintaining the orientation of a gripped tool with respect to said jaws.

* * * * *